(12) United States Patent
Fowe (10) Patent No.: US 11,580,850 B2
(45) Date of Patent: Feb. 14, 2023

(54) METHOD, APPARATUS AND COMPUTER PROGRAM PRODUCT FOR DETERMINING LANE STATUS CONFIDENCE INDICATORS USING PROBE DATA

(71) Applicant: HERE GLOBAL B.V., Eindhoven (NL)

(72) Inventor: James Adeyemi Fowe, Evanston, IL (US)

(73) Assignee: HERE GLOBAL B.V., Eindhoven (NL)

( * ) Notice: Subject to any disclaimer, the term of this patent is extended or adjusted under 35 U.S.C. 154(b) by 252 days.

(21) Appl. No.: 17/116,469

(22) Filed: Dec. 9, 2020

(65) Prior Publication Data
US 2022/0180736 A1     Jun. 9, 2022

(51) Int. Cl.
G08G 1/01       (2006.01)
G06K 9/62       (2022.01)
G08G 1/09       (2006.01)

(52) U.S. Cl.
CPC ......... *G08G 1/0108* (2013.01); *G06K 9/6223* (2013.01); *G08G 1/0125* (2013.01); *G08G 1/091* (2013.01)

(58) Field of Classification Search
CPC .... G08G 1/0108; G08G 1/0125; G08G 1/091; G08G 1/0112; G08G 1/0129; G08G 1/167; G06K 9/6223; B60W 30/12
See application file for complete search history.

(56) References Cited

U.S. PATENT DOCUMENTS

| | | | |
|---|---|---|---|
| 7,627,414 B2 | 12/2009 | Goto et al. |
| 9,240,123 B2 | 1/2016 | Stenneth |
| 10,140,856 B2 | 11/2018 | Bernhardt et al. |
| 2015/0170514 A1 | 6/2015 | Stenneth |
| 2016/0167582 A1 | 6/2016 | Chen et al. |
| 2018/0202816 A1 | 7/2018 | Kesting et al. |

(Continued)

FOREIGN PATENT DOCUMENTS

CN     108961758 A     10/2018

OTHER PUBLICATIONS

Yang et al., "Automatic Change Detection In Lane-Level Road Networks Using GPS Trajectories", International Journal of Geographical Information Science, vol. 32, No. 12, (Nov. 24, 2017), 22 pages.

(Continued)

*Primary Examiner* — Yuen Wong
(74) *Attorney, Agent, or Firm* — Alston & Bird LLP (57) ABSTRACT

A method, apparatus and computer program product are provided to determine lane status confidence indicators of lane status predictions such as closures and/or shifting. Lane statuses and corresponding confidence indicators are determined based on probe data, such as probe data collected from vehicle and/or mobile devices traveling along a road segment. Probe data may be partitioned into clusters and compared to partitioned subsets of the probe data. Cluster stability for the segment and corresponding lane status confidence indicators can be determined based on the comparison. Accordingly, determinations of whether to transmit predicted lane statuses to another system, service, and/or user device may be made.

17 Claims, 4 Drawing Sheets

(56) References Cited

U.S. PATENT DOCUMENTS

2019/0311613 A1\* 10/2019 Johnson ............... G08G 1/0112
2020/0202708 A1      6/2020 Fowe

OTHER PUBLICATIONS

Extended European Search Report for European Application No. 21213436.5 dated May 4, 2022, 9 pages.
Rogers et al., "Mining GPS Data to Augment Road Models", KDD '99: Proceedings of the fifth ACM SIGKDD International Conference on Knowledge Discovery and Data Mining (Aug. 1999), pp. 104-113.
U.S. Appl. No. 17/115,999, filed Dec. 9, 2020; In re: James Adeyemi Fowe, entitled "Method, Apparatus and Computer Program Product for Detecting A Lane Closure Using Probe Data".
U.S. Appl. No. 17/115,950, filed Dec. 9, 2020; In re: James Adeyemi Fowe, entitled "Method, Apparatus and Computer Program Product for Detecting A Lane Shift Using Probe Data".

\* cited by examiner

METHOD, APPARATUS AND COMPUTER PROGRAM PRODUCT FOR DETERMINING LANE STATUS CONFIDENCE INDICATORS USING PROBE DATA

TECHNOLOGICAL FIELD

An example embodiment relates generally to a method, apparatus and computer program product for using probe data to determine lane status confidence indicators relating to a predicted lane statuses of road segments.

BACKGROUND

Some traffic-aware routing and navigation systems detect road closure events or slowdowns caused by accidents, road construction, and/or the like by detecting the thru traffic in road segments. Such systems detect average speeds of traffic moving through a particular segment, and provide alerts relating to slowdowns when average speeds of traffic stop or differ substantially from average or normal traffic speeds for the same segment at the same time of day or time of week. In some instances, the alert may include a general cause of the slowdown, such as road construction or accident, and may provide a time estimate of additional time it will take to travel through the segment, in comparison to average or normal traffic conditions.

In many cases, the information related to the general cause such as construction or an accident, is provided to a service from another user who has passed through the area, or may be generated from integrated accident reporting systems, road construction reporting systems, and/or the like.

The information or alerts provided to drivers using such systems may be helpful for determining general traffic speeds for the segment but may not provide details pertaining to lane-level information. For example, in instances in which a segment, such as a segment of a road, includes a plurality of lanes, the segment information is oftentimes not specific as to individual lanes of the segment nor side of the road segment affected. Even if information regarding lane closure or shoulder closure is provided, such systems rely on user input, such as by another driver, or an administrator or customer service representative associated with construction activities, accident responses, and/or the like, to provide the lane-level details to a system prior to dissemination to drivers. In many cases the information may be outdated, inaccurate, and/or not provided in a timely and efficient manner to alert drivers.

BRIEF SUMMARY

A method, apparatus and computer program product are provided in accordance with an example embodiment to use probe data to determine lane status confidence indicators associated with predictions of lane statuses of segments, such as a lane closures, and/or shifting, using probe data.

U.S. patent application Ser. No. 17/115,999 titled, METHOD, APPARATUS AND COMPUTER PROGRAM PRODUCT FOR DETECTING A LANE CLOSURE USING PROBE DATA, filed Dec. 9, 2020, and U.S. patent application Ser. No. 17/115,950 titled, METHOD, APPARATUS AND COMPUTER PROGRAM PRODUCT FOR DETECTING A LANE SHIFT USING PROBE DATA, filed Dec. 9, 2020, describe determining lane statuses of a segment using probe data, and are hereby incorporated by reference in their entireties.

Example embodiments described in the above referenced applications, and certain embodiments described herein, provide detailed lane-level information and statuses by utilizing probe data collected in real-time or near real-time and comparing the probe data to historical probe data and to estimate changes in lateral positioning of vehicle probes relative to the segment, or across a segment (e.g., perpendicular to the flow of traffic). Example embodiments may therefore determine a lane status including a prediction that a lane is closed or shifted. A lane status may additionally or alternatively include a direction of lane shift or lateral offset (for example, relative to a center line running parallel to the flow of traffic), an indication of a lane associated with a leftmost and/or rightmost shift, an indication of a lane associated with the largest shift, and/or the like. The methods, apparatuses, and computer program products may further determine additional lane-level information such as the lane having a largest shift, and/or a lateral direction of a traffic shift.

The determinations described above may be, in some instances, subject to some inaccuracies. Accordingly, example embodiments of the method, apparatus, and computer program product utilize the probe data to determine a lane status confidence indicator to indicate the confidence in such lane status predictions such as those described above including but not limited to lane closure, lane shifting, direction of lane shift or lateral offset, an indication of a lane associated with a leftmost and/or rightmost shift, an indication of a lane associated with the largest shift, and/or a lane having a largest shift. A lane status confidence indicator as determined according to example embodiments provided herein may be used to determine if a predicted lane status should be transmitted to a user device or other system or service, so as to alert a driver of the lane status. If the determined lane status is reliable according to the lane status confidence indicator, an associated alert or message may be provided to drivers and/or other systems. If the determined lane status confidence indicator is associated with relatively low confidence, is unreliable or less-reliable, according to a particular condition implemented, example embodiments may determine to forgo or prevent transmittal of an associated alert or message.

An apparatus is provided comprising at least processing circuitry and at least one non-transitory memory including computer program code instructions, the computer program code instructions configured to, when executed by the processing circuitry, cause the apparatus to determine a subset of subject probe data associated with at least one segment. The computer program code instructions are configured to cause the apparatus to partition the subset of the subject probe data into a same number of clusters as the subject probe data is partitioned, wherein the subject probe data is clustered based on respective lateral positional indicators. The computer program code instructions are configured to cause the apparatus to determine a lane status confidence indicator for the at least one segment based upon statistical measures of clusters of the subject probe data, and the respective statistical measures of the respective clusters of the subset of the subject probe data.

In certain embodiments, the computer program code instructions are configured to cause the apparatus to determine whether the lane status confidence indicator satisfies a lane status confidence indicator criterion. In an instance the lane status confidence indicator criterion is satisfied, the computer program code instructions are configured to cause the apparatus to transmit an indication of a lane status determination. In an instance the lane status confidence indicator criterion is not satisfied, the computer program code instructions are configured to cause the apparatus to prevent the indication of the lane status determination from being transmitted.

Determining the lane status confidence indicator may include calculating offsets between the statistical measures of the clusters of the subject probe data, and the respective statistical measures of the respective clusters of the subset of the subject probe data. Determining the lane status confidence indicator may further include calculating a mean of the offsets between the statistical measures of the clusters of the subject probe data, and the respective statistical measures of the respective clusters of the subset of the subject probe data. The lane status determination includes at least one a lane closure or lane shifting. According to certain embodiments, the statistical measures are mean lateral positional indicators for the respective clusters. According to certain embodiments, the partitioning is performed using at least a k-means algorithm.

A method is also provided, including determining a subset of subject probe data associated with at least one segment. The method includes, with at least a processor, partitioning the subset of the subject probe data into a same number of clusters as the subject probe data is partitioned, wherein the subject probe data is clustered based on respective lateral positional indicators. The method further includes determining a lane status confidence indicator for the at least one segment based upon statistical measures of clusters of the subject probe data, and the respective statistical measures of the respective clusters of the subset of the subject probe data.

In certain embodiments, the method includes determining whether the lane status confidence indicator satisfies a lane status confidence indicator criterion, and in an instance the lane status confidence indicator criterion is satisfied, transmitting an indication of a lane status determination. In an instance the lane status confidence indicator criterion is not satisfied, the method includes preventing the indication of the lane status determination from being transmitted.

A computer program product is also provided, comprising at least one non-transitory computer-readable storage medium having computer-executable program code instructions stored therein, the computer-executable program code instructions comprising program code instructions to determine a subset of subject probe data associated with at least one segment. The computer-executable program code instructions further include program code instructions to partition the subset of the subject probe data into a same number of clusters as the subject probe data is partitioned, wherein the subject probe data is clustered based on respective lateral positional indicators, and to determine a lane status confidence indicator for the at least one segment based upon statistical measures of clusters of the subject probe data, and the respective statistical measures of the respective clusters of the subset of the subject probe data.

The computer-executable program code instructions further include program code instructions to determine whether the lane status confidence indicator satisfies a lane status confidence indicator criterion. In an instance the lane status confidence indicator criterion is satisfied, the computer-executable program code instructions further include program code instructions to transmit an indication of a lane status determination. In an instance the lane status confidence indicator criterion is not satisfied, the computer-executable program code instructions further include program code instructions to prevent the indication of the lane status determination from being transmitted.

An apparatus is also provided, including means for determining a subset of subject probe data associated with at least one segment. The apparatus includes means for partitioning the subset of the subject probe data into a same number of clusters as the subject probe data is partitioned, wherein the subject probe data is clustered based on respective lateral positional indicators. The apparatus further includes means for determining a lane status confidence indicator for the at least one segment based upon statistical measures of clusters of the subject probe data, and the respective statistical measures of the respective clusters of the subset of the subject probe data.

In certain embodiments, the apparatus includes means for determining whether the lane status confidence indicator satisfies a lane status confidence indicator criterion, and in an instance the lane status confidence indicator criterion is satisfied, means for transmitting an indication of a lane status determination. In an instance the lane status confidence indicator criterion is not satisfied, the apparatus includes means for preventing the indication of the lane status determination from being transmitted.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Figure 1:
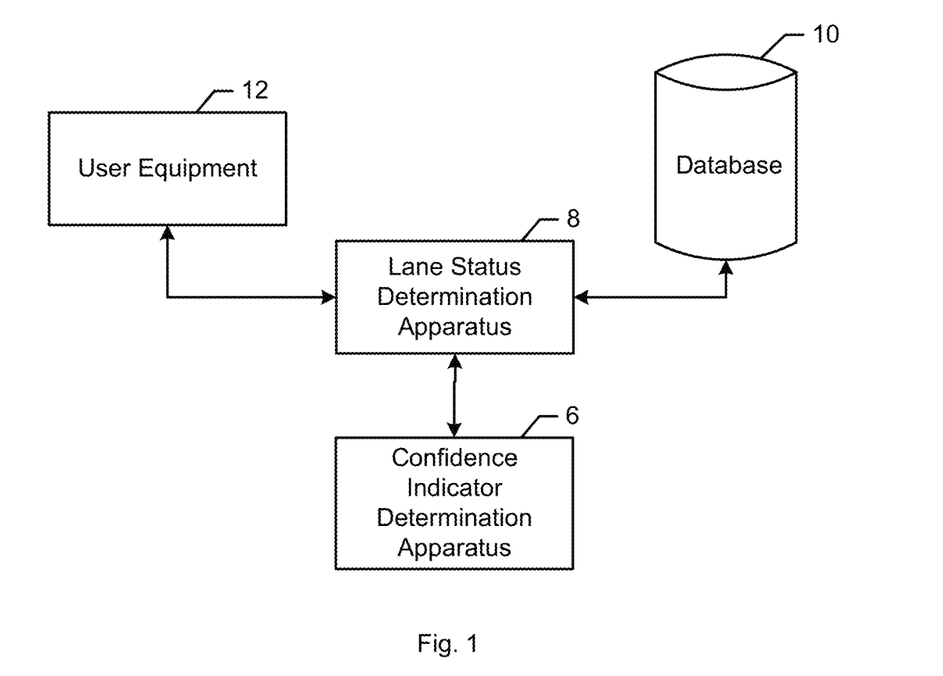
FIG. 1 is a system diagram depicting a lane status determination apparatus in data communication with user equipment and a database, in accordance with an example embodiment of the present disclosure.

Referring to FIG. 1, an exemplary system in which certain example embodiments operate is depicted. The illustrated embodiment of FIG. 1 includes a confidence indicator determination apparatus 6 in data communication with a lane status determination apparatus 8, user equipment (UE) 12, a database 10. The components of FIG. 1 may communicate over a network that may be wired, wireless, or any combination of wired and wireless communication networks, such as cellular, Wi-Fi, internet, local area networks, or the like In general, probe data, such as vehicle probe data, collected from probe devices, is collected and stored in database 10. In this regard, any of a variety of devices may serve as a probe device, such as a mobile device, (e.g., a smartphone, a tablet computer, a personal digital assistant (PDA), a personal navigation device (PND), or the like), an in-vehicle navigation system, a vehicle control system, an ADAS or the like, that provides samples of probe data regarding, for example, the location of a vehicle as the vehicle proceeds along a road. The probe data may include not only the location of the vehicle as may be defined by a global positioning system (GPS) associated with the probe, and the time (e.g., timestamp, time of day, and/or time of week) at which the vehicle is at the location, but also the speed, the heading and other parameters that define the current behavior of the vehicle.

In certain embodiments, the database 10 may be populated and maintained by a separate service accessible by confidence indicator determination apparatus 6 and/or lane status determination apparatus 8 and may further include a map database and/or map data. While database 10 is illustrated as a single database in FIG. 1, it will be appreciated that in certain embodiments, a map database may be implemented separately from a database storing the probe data, and the probe data may include any location-based data that enables association with a road segment, or segment, defined by a map database, such as via a map matching technique described in further detail below.

The map data, such as the map data stored on database 10, may be maintained by a content provider such as a map developer. By way of example, the map developer can collect geographic data to generate and enhance the database 10. There can be different methods used by the map developer to collect data. These methods can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning.

The database 10 may include a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 12, for example. Further, data may be compiled defining segments of the map database.

The compilation to produce the end user database(s) can be performed by a party or entity separate from the confidence indicator determination apparatus 6 and/or lane status determination apparatus 8. For example, a navigation device developer or other end user device developer, can perform compilation on a received map database and/or probe database in a delivery format to produce one or more compiled databases. For example, as discussed herein, probe data may be map matched to segments defined in the map database. Example embodiments, such as confidence indicator determination apparatus 6 may therefore access and utilize historical probe data that is map matched to a segment. However, in certain embodiments lane status determination apparatus 8 may perform a map matching technique to match probe data to a segment and utilize the matched data as described in further detail herein.

As mentioned above, the database 10 may include a master geographic database, but in alternate embodiments, the database 10 may represent a compiled navigation database that may be used in or with end user devices (e.g., user equipment 12) to provide navigation and/or map-related functions. For example, the database 10 may be used with the user equipment 12 to provide an end user with navigation features. In such a case, the database 10 can be downloaded or stored on the end user device (user equipment 12) which can access the database 10 through a wireless or wired connection, such as via the lane status determination apparatus 8, for example.

In an example embodiment, the map data may include node data, road segment data or link data, point of interest (POI) data or the like. The database may also include cartographic data, routing data, and/or maneuvering data. According to some example embodiments, the road segment data records may be segments or segments representing roads, streets, or paths, as may be used in calculating a route or recorded route information for determination of one or more personalized routes. The map data may include various attributes of road segments and/or may be representative of sidewalks or other types of pedestrian segments, as well as open areas, such as grassy regions or plazas. The node data may be end points corresponding to the respective segments of road segment data. The segment data and the node data may represent a road network, such as used by vehicles, cars, trucks, buses, motorcycles, and/or other entities. Optionally, the database may contain path segment and node data records or other data that may represent bicycle lanes, pedestrian paths or areas in addition to or instead of the vehicle road record data, for example. The segment segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database can include data about the POIs and their respective locations in the POI records. The database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database. The map database may further indicate a plurality of contiguous segments as a strand. It will be appreciated that some references made herein to a single segment may refer to a strand comprising multiple segments. Accordingly, resultant data may be generated that is associated with a strand, or a plurality of contiguous segments.

According to example embodiments, the map data is utilized in a manner that enables probe data to be associated with a segment. In addition to, or alternatively to the probe data including location data, such as GPS location, the probe data may also include an identifier, such as a trajectory identifier, that identifies the probe that provides the probe data and enables the linking of instances of probe data into vehicle trajectories and probe traces while still, in some embodiments, maintaining the anonymity of the probe device and/or a vehicle that the probe device is onboard. Thus, probe traces define the path of a probe device, such as may be carried by a vehicle during its travel along a portion of the road network.

As such, example embodiments may collect subject probe data associated with a segment and compare positional information to that of historical probe data for the same segment. The data may be compared in real-time or near real-time such that alerts regarding lane statuses, including but not limited to closed and/or shifted lanes, may be provided to drivers traveling in or approaching the affected segment.

Certain example embodiments, such as confidence indicator determination apparatus 6, may further analyze probe data to determine a lane status confidence indicator of a lane status determined by lane status determination apparatus 8. In certain embodiments, if the lane status confidence indicator satisfies a confidence indicator criterion, the lane status may be transmitted, such as to user equipment 12 as described below. In certain embodiments, if the lane status confidence indicator does not satisfy a confidence indicator criterion, the determine lane status may not be transmitted to other devices and/or services, as described in further detail below.

In certain embodiments, confidence indicator determination apparatus 6 and lane status determination apparatus 8 may be implemented separately, and in certain embodiments, the confidence indicator determination apparatus 6 and lane status determination apparatus 8 may be implemented by the same device, server, and/or distributed system.

Accordingly, if the confidence indicator criterion is satisfied based on the confidence indicator, an associated alert may be provided to any user equipment 12 such as a navigation system, an advanced driver assistance system (ADAS), an in-vehicle infotainment system, a mobile device (such as one configured to access a mapping or navigation application or website), a dynamic road sign, a personal navigation device (PND), a portable navigation device, a cellular telephone, a smart phone, a personal digital assistant (PDA), a watch, a camera, a computer, and/or other device. In certain embodiments, the user equipment 12 may include a mobile device associated, coupled, or otherwise integrated with a vehicle, such as in a vehicle's head unit, infotainment unit, navigation system, or an ADAS, for example. In certain embodiments, the user equipment 12 configured to provide alerts and navigational-related information may embody a same probe device that transmits probe data over the network for processing as described herein.

As used herein, the terms real-time and near real-time indicate a seemingly instant accounting of probe data associated with a segment for a given time period leading up to a present or current time. Additionally or alternatively, a response to a request described herein may be provided in real-time or near real-time at the user equipment 12 such that the response time is seemingly instant relative to when the request was made or initiated. For example, a vehicle approaching a segment may trigger a request for lane-level information for the segment, and example embodiments may utilize real-time or near real-time subject probe data of other vehicles traveling on the segment (in a period of time leading up to a current time) to assess current (e.g., real-time or near real-time) lane statuses, and provide a response in real-time or near real-time to user equipment 12. It will be appreciated that despite references to current, real-time, or near real-time, certain delays based on computer processing time may be encountered. Performing certain operations described herein in real-time or near real-time may enable accurate lane statuses and alerts to be provided in a timely manner to drivers and/or vehicles, such as those approaching a segment with a closed and/or shifted lane. However, for the purposes of generating a lane status confidence indicator according to example embodiments, the lane status confidence indicator may be generated based on real-time or near real-time data, and/or may be generated using historic data, and/or on a longer repeated time interval, such as monthly. Times that lane status confidence indicators may be generated, and/or time intervals on which lane status confidence indicators may be generated are discussed in further detail herein.

Figure 2:
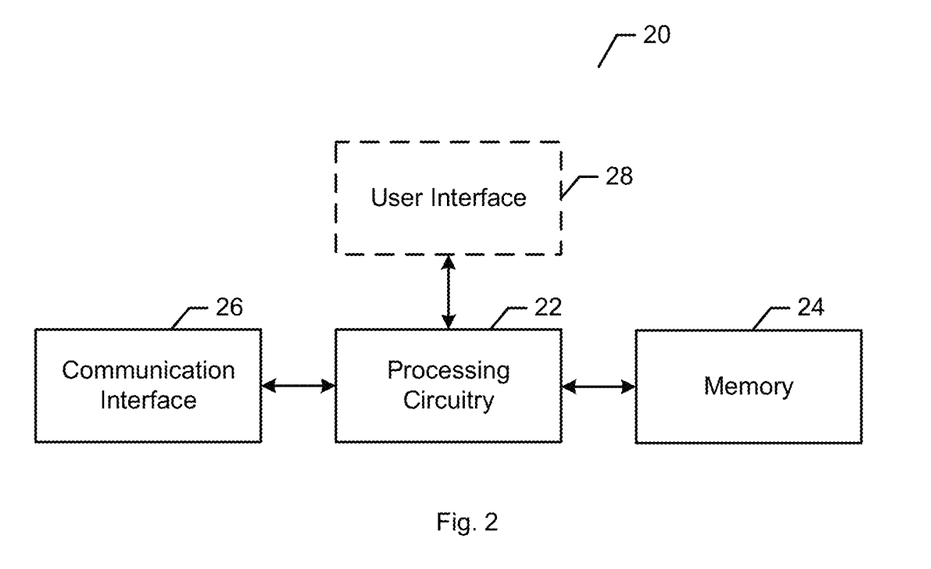
FIG. 2 is a block diagram illustrating an apparatus that may be configured to detect a lane closure in accordance with an example embodiment of the present disclosure.

As shown in FIG. 2, an apparatus 20 is provided in accordance with an example embodiment, for implementing the confidence indicator determination apparatus 6, lane status determination apparatus 8 and/or user equipment 12. The apparatus of certain embodiments, such as the confidence indicator determination apparatus 6 and/or lane status determination apparatus 8, may be embodied by any of a wide variety of different computing devices including, for example, a server, a computer workstation, a personal computer, a desktop computer or any of a wide variety of computing devices and/or distributed system. In certain embodiments, the user equipment 12 may be embodied by a wide variety of computing devices including, but not limited to, mobile devices, in-vehicle navigation systems, other navigation systems, in-vehicle infotainment systems, dynamic road signs, personal computers, and/or the like. Regardless of the type of computing device that embodies the apparatus 20, the apparatus of an example embodiment includes, is associated with or is in communication with processing circuitry 22, memory 24 and communication interface 26. A user interface 28 is included in apparatus 20 when the apparatus is embodied by user equipment 12, but may be optional when apparatus 20 is embodied by a confidence indicator determination apparatus 6 and/or lane status determination apparatus 8.

In some embodiments, the processing circuitry 22 (and/or co-processors or any other processors assisting or otherwise associated with the processing circuitry) may be in communication with the memory device 24 via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processing circuitry.

The processing circuitry 22 may be embodied in a variety of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, a computing device) configured to employ an embodiment of the present invention by further configuration of the processor by instructions for performing the algorithms and/or operations described herein. The processing circuitry may include, among other things, a clock, an arithmetic logic unit (ALU) and logic gates configured to support operation of the processing circuitry.

The apparatus 20 of an example embodiment may also optionally include a communication interface 26 that may be any means such as a device or circuitry embodied in either hardware or a combination of hardware and software that is configured to receive and/or transmit data from/to other electronic devices in communication with the apparatus, such as any of the components of FIG. 1. Additionally or alternatively, the communication interface may be configured to communicate in accordance with various wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In this regard, the communications interface 26 may facilitate the collection of, and/or access to, probe data, and access to map data.

The apparatus 20 of an example embodiment, such as user equipment 12, may also optionally include a user interface 28 that provides an audible, visual, mechanical, or other output to the user. As such, the user interface 28 may include, for example, a keyboard, a mouse, a display, a touch screen display, a microphone, a speaker, and/or other input/output mechanisms. As such, in embodiments in which apparatus 20 is implemented as user equipment 12, the user interface 28 may, in some example embodiments, provide means for provision of alerts relating to lane statuses, such as but not limited to closure and/or shifting of a lane. In some example embodiments, aspects of user interface 28 may be limited or the user interface 28 may not be present.

Figure 3A:
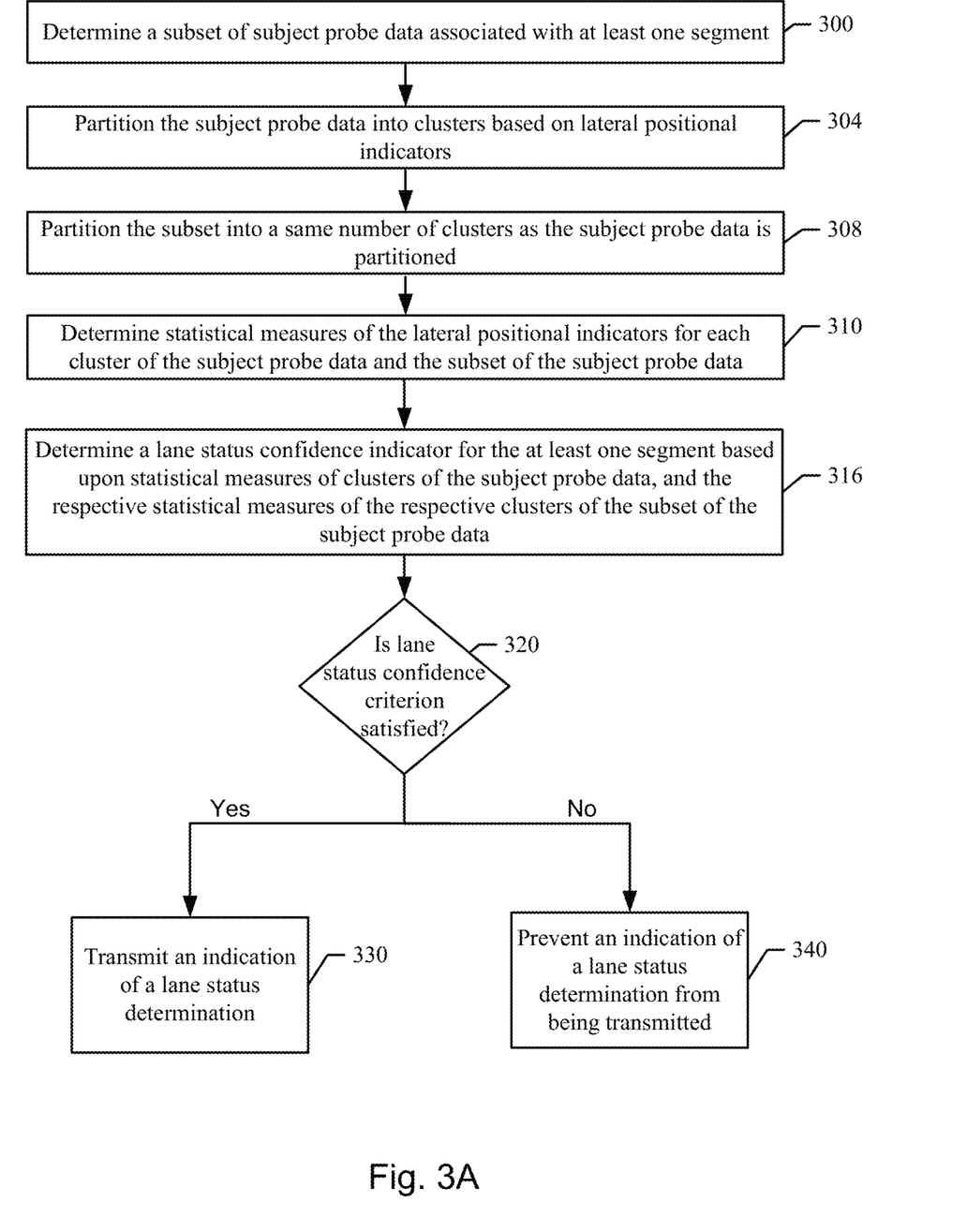
FIG. 3A is a flowchart illustrating operations performed in accordance with an example embodiment of the present disclosure.

FIG. 3A is a flowchart illustrating example operations of an apparatus 20, according to example embodiments. The operations of FIG. 3A may be performed by apparatus 20, such as with the confidence indicator determination apparatus 6, and/or the like.

As shown in operation 300, apparatus 20 includes means, such as processing circuitry 22, memory 24, communication interface 26, and/or the like, for determining a subset of subject probe data associated with at least one segment.

The segment(s) for which subject probe data and the subset thereof is processed as described below, may be indicated or determined in a systematic manner, such that the process described below may be performed for a variety of segments on a routine basis. For example, certain example embodiments may determine lane status confidence indicators for segment(s) on a monthly basis, and/or other interval. Accordingly, the lane status confidence indicators may be stored in associated with a segment(s), associated geographic area, and/or the like, for subsequent use.

As another example, a vehicle and/or associated user or in-vehicle navigation system may be registered with a service to receive lane statuses such that as the vehicle approaches a segment, a request is initiated and example embodiments determine lane statuses of the segment, and a lane status confidence indicator of any such lane status determinations, as described in further detail below. In certain embodiments in which lane status confidence indicators are generated on a routine basis or time interval, a trigger generated by a vehicle approaching a segment could result in access to a stored lane status confidence indicator associated therewith, to determine whether any associated lane statuses determine based on real-time or near real-time probe data may be considered reliable and/or accurate.

In any event, the subject probe data may include all the probe data available for a segment, or one or more segments such as those associated with a geographic area, or may include most recent probe data spanning the past month, 6 months, and/or any other time period leading up to a certain time, such as a current or real time.

Figure 3B:
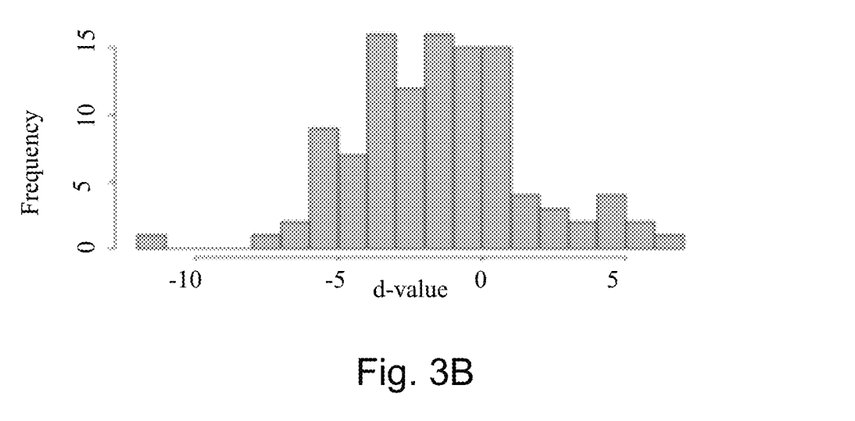
FIGS. 3B and 3C are histograms of probe data in accordance with an example embodiment of the present disclosure.

Apparatus 20 may access the probe data on database 10, over communication interface 26. Apparatus 20, such as processing circuitry 22, may then select a subset of probe data that excludes at least a portion of the subject probe data. For example, FIG. 3B is a histogram of subject probe data. The subject probe data may include all the probe data available for a segment, or one or more segments such as those associated with a geographic area. According to certain embodiments, the segments associated with the subject probe data may be linked together and/or connected. In any event, the subject probe data comprises more probe data than the subset of the subject probe data, such as the subset of the subject probe data plotted in the histogram of FIG. 3C. In this regard, apparatus 20, such as with processing circuitry 22, may randomly determine the subset of probe data from the subject probe data. In certain embodiments, the subset may include a predetermined percentage of the subject probe data, such as 10% and/or a fixed size sample of data points. The subset of subject probe data may be selected from the subject probe data at random. The subject probe data may reflect dense probes, and the subset of the subject probe data may reflect sparse probes. Other variations to determine a subset of the subject probe data that excludes at least a portion of the subject probe data may be contemplated.

Figure 3C:
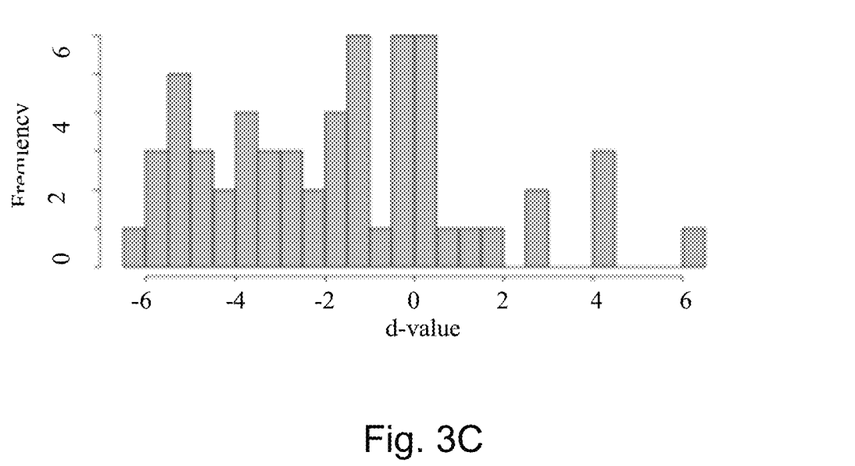

The histograms of FIGS. 3B and 3C indicate the frequencies, or counts, of each probe data point having certain lateral indicators or ranges thereof relative to the segment, such as d-values, described in further detail below. The label of the y-axis, "Frequency" along with the corresponding frequencies indicated by both histograms illustrate that the number of data points of the subset of subject probe data represented in FIG. 3C is smaller than the subject probe data plotted in FIG. 3B.

As shown in operation 304, apparatus 20 includes means, such as processing circuitry 22, memory 24, communication interface 26, and/or the like, for partitioning the subject probe data into clusters based on their respective lateral positional indicators.

Figure 4:
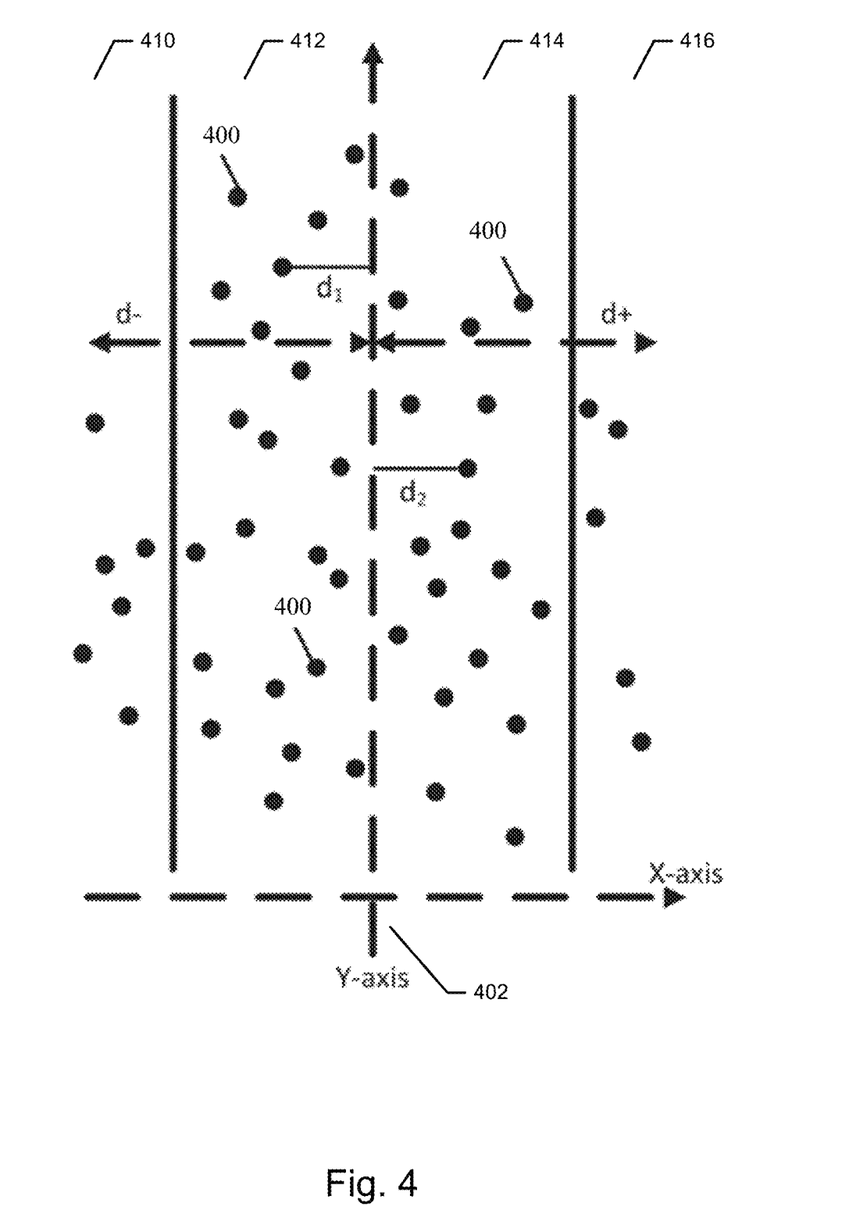
FIG. 4 is a schematic of positional indicators of probe data relative to a center line vector in accordance with an example embodiment of the present disclosure.

An example of partitioning probe data by lateral positional indicators is illustrated in FIG. 4. A plurality of probe data, or "probes" 400 of a segment are plotted by their deviation or d-value (e.g., $d_1$ and $d_2$ in FIG. 4) as the lateral distance, or x-distance between the probe position and a center line vector 402. As illustrated in FIG. 4, the center line vector 402 may be a y-axis vector positioned in the center of a segment, such as by determining a lateral midway point of a spread of the probe data, mean or median lateral positional indicator of the probe data, and/or the like. A center line vector 402 may additionally or alternatively be identified based on map data and/or any other means. As another example, the center line vector 402 may be determined may be a y-axis vector positioned in the center of an even number of clusters, or a y-axis vector positioned in the center of a center cluster of an odd number of clusters (not shown), and running parallel to the flow of traffic, as indicated by the map matching algorithm and/or trajectories of probe data.

The center line vector 402 is provided herein as an exemplary basis by which to determine a lateral positional indicator, but it will be appreciated that various modifications may be contemplated. For a plurality of probes 400, indicated in FIG. 4 according to the position or location data associated therewith, a center line vector 402 may be generated that represents an estimated center line of a segment.

D-values to the left of the center line vector 402 have negative values and d-values to the right of the center line vector 402 have positive values. The sign or polarity of a positional indicator (e.g., d-value) may indicate direction of the probe from the center line vector 402, and the absolute value of the d-value indicates how far the probe is from the center line vector 402, measured laterally, or at a direction orthogonal to, or substantially orthogonal to the flow of traffic (and/or center line vector 402). As used herein, d-value may refer to the distance from the center line vector 402, but it will be appreciated that the lateral positional indicators may be modified by using a different basis than the center line vector 402. A d-value may therefore be considered a lateral positional indicator of the probe. In any event, the d-values may then be used to partition the clusters, such as by using any suitable clustering algorithm, such as k-means.

With regard to performing the k-means algorithm, it will be appreciated that example embodiments, such as processing circuitry 22, may utilize any number of clusters k. As shown in FIG. 4, the k-means algorithm may be performed with k=4 to partition the probe data into four clusters 410, 412, 414 and 416. The value of k need not necessarily be the number of lanes of the segment, but rather may be a value determined as producing accurate results, such as in comparison to utilizing a different k-value producing less accurate results. To assess accuracy of different k-values, a data analyst may study the results of certain samples, according to example embodiments provided herein, and configure or program a k-value. As another example, different k-values may be determined for different segments, or segments having specific characteristics as indicated by the map data. One k-value may be determined for segments having one or more predefined ratings and/or classifications, while a different k-value may be determined for segments having one or more different predefined ratings and/or classifications according the map data.

In operation 308, apparatus 20 includes means, such as processing circuitry 22, memory 24, and/or the like, for partitioning the subset of the subject probe data associated with the segment(s) into the same number of clusters as the subject probe data is partitioned. Example embodiments may perform the same or similar clustering algorithm as described with respect to operation 304, such as a k-means algorithm. Accordingly, the larger set of subject probe data is partitioned into k-clusters, and the smaller subset of probe data is partitioned into the same number of k-clusters.

As such, in operation 310, apparatus 20 includes means, such as processing circuitry 22, memory 24, and/or the like, for determining statistical measures of the lateral positional indicators for each cluster of the subject probe data and the subset of the subject probe data. For example, a mean d-value may be computed for each cluster of the subject probe data and/or the subset of the subject probe data. A statistical measure of the lateral positional indicator, such as a mean d-value for each cluster indicates a positioning of that cluster either on the left or right or center of the center line vector 402, and to what extent. It will be appreciated that the center line vector 402 used as the basis of d-value of the subset of subject probe data should be the same as the center line vector 402 of the subject probe data, to provide an equal basis for comparison. In this regard, the center line vector 402 is not necessarily recalculated for the subset of subject probe data but rather refers to the center line vector 402 of the subject probe data.

The sign or polarity of the statistical measure (e.g., mean d-value) of the lateral positional indicators for a cluster indicate direction of the cluster from the center line vector 402, and the absolute value of the statistical measure (e.g., mean d-value) provides a lateral indicator of distance of the cluster from the center line vector 402 (measured at a direction orthogonally to, or substantially orthogonally to, the flow of traffic).

Although the statistical measure of a lateral positional indicator of a cluster may be frequently referenced herein as the mean d-value of the d-value of the cluster, it will be appreciated that other statistical measures, such as median, may be used. While reference to a center line vector 402 and d-values defined as a lateral offset from the center line vector 402 are made herein, it will be appreciated that other methods for determining a baseline vector and/or corresponding lateral positional indicators of probes may be contemplated.

As an example, mean d-values of the subject probe data of FIG. 3B, and the subset depicted in FIG. 3C, when using k=3, or 3 clusters are respectively provided in Table 1 below. In Table 1, clusters $3B_1$, $3B_2$, and $3B_3$ are the clusters of subject probe data of FIG. 3B, and clusters $3C_1$, $3C_2$, and $3C_3$ are the clusters of the subset of subject probe data of FIG. 3C.

TABLE 1

| Subject probe data | | Subset of subject probe data | |
|---|---|---|---|
| Cluster | Mean d-value | Cluster | Mean d-value |
| $3B_1$ | −4.19 | $3C_1$ | −4.44 |
| $3B_2$ | −0.51 | $3C_2$ | −0.7 |
| $3B_3$ | 3.73 | $3C_3$ | 3.79 |

Mean d-values of the subject probe data of FIG. 3B, and the subset depicted in FIG. 3C, when using k=4, or 4 clusters are respectively provided in Table 2. In Table 2, clusters $3B_1$, $3B_2$, $3B_3$, and $3B_4$ are the clusters of subject probe data of FIG. 3B, and clusters $3C_1$, $3C_2$, $3C_3$, and $3C_4$ are the clusters of the subset of subject probe data of FIG. 3C.

TABLE 2

| Subject probe data | | Subset of subject probe data | |
|---|---|---|---|
| Cluster | Mean d-value | Cluster | Mean d-value |
| $3B_1$ | −5.67 | $3C_1$ | −4.98 |
| $3B_2$ | −2.54 | $3C_2$ | −2.19 |
| $3B_3$ | 0.17 | $3C_3$ | 0.16 |
| $3B_4$ | 4.22 | $3C_4$ | 4.1 |

Table 1 and Table 2 are provided merely as examples to illustrate potential results based on different k-values. It will be appreciated that in certain embodiments, the operations and/or processes described herein, may only need to be performed for one k-value. However in certain embodiments, certain operations and/or processes may be repeated for different k-values.

In operation 316, apparatus 20 includes means, such as processing circuitry 22, memory 24, and/or the like, for determining a lane status confidence indicator for the at least one segment based upon statistical measures of clusters of the subject probe data, and the respective statistical measures of the respective clusters of the subset of the subject probe data. The lane status confidence indicator may comprise a Boolean value reflecting "confident" or "not-confident," or may be calculated as a numerical value, such as by percent confidence (e.g., 0%-100%), or other quantifiable measure or rating.

As one example of determining a lane status confidence indicator, example embodiments, such as processing circuitry 22, may compare a statistical measure of the subject lateral positional indicators to respective statistical measures of the subject probe data lateral positional indicators, for each cluster. It will be appreciated that example embodiments may optionally sort the statistical measure of the subject lateral positional indicators in the same order for both the subject probe data and subset thereof such that the statistical measures may be compared for respective clusters. The data in Tables 1 and 2 are sorted accordingly.

In general, if example embodiments, such as processing circuitry 22 determine that the respective statistical measures (e.g., mean d-values) of clusters of the subject probe data and subset thereof are relatively close to each other, example embodiments further determine the segment exhibits cluster stability. Determining cluster stability, such as based on a lane status confidence indicator discussed in further detail below, enables example embodiments and/or systems integrated therewith to determine that lane status determinations associated with the segment (e.g., closure, shifting, and/or the like) are reliable or may be predicted with a higher confidence than those that lack cluster stability or have lower cluster stability. When example embodiments, or other systems and/or apparatuses determine a lane status based on a real-time, near real-time or current set of probe data, the cluster stability and/or the lane status confidence indicator may further indicate the reliability of the real-time, near real-time or current set of probe data accurately reflecting the traffic conditions. Accordingly, the cluster stability indicates the probability or confidence of the determined lane status being accurate.

In contrast to stable clusters, if the statistical measures for each cluster of the subject probe data and subset thereof are relatively far apart, the segment generally exhibits cluster instability or low cluster stability. If a segment is determined to exhibit unstable clusters or low cluster stability, example embodiments determine that lane status determinations associated therewith (e.g., closure, shifting, and/or the like) are less reliable or may be predicted with a lower lane status confidence indicator than those that have higher cluster stability. Accordingly, when a smaller, randomly selected subset of subject probe data exhibits similar or the same cluster properties as those of the subject probe data, the segment reflects cluster stability and/or relatively high confidence in lane status determinations.

A degree or measure of closeness or distance of the statistical measures to determine the lane status confidence indicator may be evaluated in a variety of ways.

In certain example embodiments, to compare the statistical measures, example embodiments may determine offsets of the mean d-values for each cluster of the subject probe data from the mean d-values of the respective d-value of the subset of the subject probe data. For example, with reference to Table 1, the absolute values of differences, or offsets, between respective clusters are 0.25, 0.19, and 0.06 meters. Other units of measure, such as feet, may be contemplated.

In certain example embodiments, an offset threshold may be predetermined or pre-configured for example, such as 0.4 meters. If an offset threshold is configured, apparatus 20, such as processing circuitry 22, may determine the lane status confidence indicator relative to the offset threshold in a variety of ways. For example, in certain embodiments, all statistical indicators of the cluster are less than the offset threshold, or are equal to or less than the offset threshold (depending on implementation) to determine a lane status confidence indicator as "confident." As another example, the average or mean of all the offsets are less than the offset threshold, or are less than or equal to the offset threshold to determine a lane status confidence indicator as "confident." For example, the three offsets of Table 1 are below the example offset threshold of 0.4 meters. The mean of the three offsets reflected in Table 1 is 0.16 meters, such that the mean of the offsets is also less than the offset threshold. Regardless of the implementation or configuration, example embodiments determine the statistical indicators of Table 1 are close such that the clusters are stable, and the lane status confidence indicator is set to "confident." In certain embodiments, if the configured offset threshold is met or exceeded (e.g., depending on implementation), example embodiments may determine the associated clusters are unstable, and the lane status confidence indicator as "not-confident."

Additionally or alternatively, if an offset threshold is used, various offset thresholds may be configured dependent on the k-value. For example, Table 2, reflecting mean d-values using 4 clusters produces different offsets than Table 1. In this regard, different offset thresholds may be contemplated for different k-values.

Various other calculations and/or methods may be contemplated for determining the lane status confidence indicator. For example, the mean of offsets, such as 0.16 meters of Table 1 described above, may be applied to a polynomial that reflects an inverse relationship between offsets (and/or mean offsets) and confidence levels. For example, a low offset and/or mean offset of 0.0001 meters may reflect a confidence level of 98%, whereas a relative higher offset, such as 0.7 meters may reflect a lower confidence level of 30%. Any equation, algorithm, and/or polynomial expression may be contemplated to quantify the lane status confidence indicator. For example, any methods to determine a level of accuracy at which a subset or sample of data reflects a larger set of data, may be used.

In certain embodiments, the lane status confidence indicator may be transmitted to another system, service, and/or apparatus, such as for use in conjunction with a lane status determination, such as a lane status determined by lane status determination apparatus 8. Accordingly, other systems, services, and/or apparatuses may determine how to process a lane status determination based on the lane status confidence indicator.

In certain embodiments, as shown by decision 320, apparatus 20 may include means, such as processing circuitry 22, memory 24, and/or the like, for further processing the lane status confidence indicator to determine if a lane status confidence criterion is satisfied. In certain embodiments, the lane status confidence criterion is satisfied if the lane status confidence indicator indicates "confident," and not satisfied if the lane status confidence indicator indicates "not confident." As another example, such as when the lane status confidence indicator is calculated as a quantifiable measure, a lane status confidence criterion may be configured with a lane status confidence threshold. Various systems and/or services may therefore configure different lane status confidence criterions. For example, certain embodiments may require a lane status confidence indicator be 95% or greater, or greater than 95%, for the lane status confidence criterion to be satisfied. Still further, various systems and/or services may configure different lane status confidence criterions for different determined lane statuses (e.g., 95% to determine lane closure, and 80% to determine lane shifting). Additionally or alternatively, the lane status confidence criterion may be determined as satisfied, if the lane status confidence indicator reflects a relationship that is predefined accordingly to example embodiments. Various configurations may be contemplated.

If the lane status confidence criterion is satisfied, as shown by operation 330, apparatus 20 may include means, such as processing circuitry 22, memory 24, communication interface 26, and/or the like, for causing transmission of the lane status determination. In certain embodiments, apparatus 20 may further include means, such as processing circuitry 22, memory 24, communication interface 26, user interface 28, and/or the like, for causing provision of an alert via a user interface regarding a lane status, such as but not limited to a closed and/or shifted lane. Accordingly, example embodiments may transmit an indication of a lane status determination and/or associated message to user equipment 12. The lane status determination and/or associated message may include an indicator such as a lane being closed, and/or shifted, and/or any other information relating to a lane closure, and/or shifting, determined according to example embodiments described herein. For example, a lane status may include a direction of lane shift or lateral offset, an indication of a lane associated with a leftmost and/or rightmost shift, an indication of a lane associated with the largest shift, and/or the like. In any event, a user interface 28 of user equipment 12 may then provide an alert, message, or indication to a user regarding the lane status(es). Accordingly, drivers approaching or in a segment determined as having a lane closure or shifting may be alerted and provided the relevant lane status information. In certain embodiments, the determined lane status may only be transmitted and/or provided to user equipment 28 if the lane status confidence indicator is satisfied.

Other modifications or configurations may be contemplated. For example, in certain embodiments, determined lane statuses and corresponding confidence indicators may be transmitted to another entity such as a system, apparatus, or service (e.g., lane status determination apparatus 8) and the recipient entity may determine whether to provide the lane status to user interface 28 and/or user equipment 12.

If the lane status confidence criterion is not satisfied, as shown by operation 340, apparatus 20 may include means, such as processing circuitry 22, memory 24, communication interface 26, and/or the like, for preventing an indication of the lane status determination from being transmitted. In this regard, certain embodiments may prevent the lane status determination from being transmitted to and presented via the user interface 26. However, as indicated above, in certain embodiments, the lane status determination may be transmitted to another entity such as an apparatus, service or system, along with the lane status confidence indicator, and the recipient entity, such as an apparatus, service or system may determine to prevent the lane status determination from being further transmitted to the user equipment 12, and/or prevent the lane status determination from being provided via user interface 26. Various configuration and/or implementations may be contemplated.

It will be appreciated that in addition to alerting a driver of any determined lane statuses described herein, the lane statuses may be used for any other means, such as making predictions regarding traffic speeds or backups, including future speeds or backups impacted by the determined lane statuses. Accordingly, example embodiments, and/or systems and/or service in data communication therewith may determine how to utilize or treat such predictions based on the lane status confidence indicator. Additionally or alternatively, a lane status confidence indicator determined from analyzed probe data associated with a segment(s) may be considered as representative of a broader set of segments, or a broader geographic area. In certain embodiments, another characteristic of roads or segments may be correlated to lane status confidence indicators, such that example embodiments may employ lane status determinations in areas or for road segments known to yield relatively more accurate or reliable results, as determined by any predefined relationship with the lane status confidence indicator (e.g., probe data from areas associated with lane status confidence indicators of 90% or higher may be further analyzed for lane statuses). For example, when applying an analysis of probe data as discussed herein to probe data associated with New York City, example embodiments may determine low cluster stability, and/or low confidence rates in associated predicted lane statuses due to inconsistencies or instabilities in probe data. Accordingly, lane status confidence indicators generated from at least one pair of subject probe data and the subset thereof according to example embodiments disclosed herein may be applied to other areas of the same city, or other cities and/or geographic areas having similar demographics or traffic patterns.

According to example embodiments provided herein, by using probe data, apparatus 20 may automatically determine real-time or near real-time lane statuses such as but not limited to closures and/or shifting. Example embodiments may be economically scalable across a vast array of geographic areas regardless of technological infrastructure, or independent of further infrastructure development, due to probe data being relatively inexpensive and widely available. Many telecommunications and information exchanges are currently deployed world-wide to enable the purchase of and/or access to probe data, such as those used to track general segment-level traffic volumes, speeds, or conditions.

Alternative attempts to determine lane statuses, and corresponding confidence indicators, if any, may rely on expensive technological infrastructure such as light detection and ranging (LIDAR) systems, other remote sensing systems and/or computer vision systems. In some cases, implementation of such equipment and systems on every segment for which lane status are desired may be unfeasible. In any event, example embodiments conserve processing and memory resources that would otherwise be expended to operate such equipment and systems, even if deployed, along segments for which lane statuses are desired.

Additionally or alternatively, example embodiments utilize lane status confidence indicators to prevent lane status determinations from being transmitted when the lane status is determined to be unreliable or less reliable than what is required by a lane status confidence criterion. In this regard, example embodiments conserve processing and memory resources that would otherwise be expended to transmit all, or a larger number of lane statuses, some of which may be inaccurate and/or determined as less reliable.

The method, apparatus 20 and computer program product of certain embodiments may leverage readily available probe data for a reasonable and feasible cost, and in a meaningful way, to determine lane statuses and corresponding lane status confidence indicators such that the lane statuses may be selectively transmitted to drivers and/or other systems, services, and/or applications. Raw GPS signals and/or probe data considered in isolation or in small quantities may not always provide the positional accuracy needed to make accurate lane-level predictions 100% of the time, or may be too noisy to always infer accurate lane-level predictions. Utilizing historic probe data to establish baseline patterns of statistical measures, and comparing real-time or near real-time probe data thereto enables the method, apparatus 20 and computer program product of certain embodiments to determine lane statuses that are useful for drivers, traffic reporting applications, and/or the like. Further performing the analysis of a subset of subject probe data and comparing it to the subject probe data as described herein enables generation of a lane status confidence indicator. As such, providing the lane status confidence indicator provides a meaningful limitation to the prediction of lane statuses, by providing guidance as to which lane statuses may be considered reliable, or confidently predicted.

Example embodiments therefore provide an improvement to the use of probe data, and more specifically, provide an improvement to the use of probe data in determining lane statuses, by further providing the confidence indicator to indicate estimated reliability of such predictions. For example, in certain embodiments which only lane statuses are transmitted when a lane status confidence criterion is satisfied, an end user may experience increased trust and perceive the data as reliable. Accordingly, generating a lane status confidence indicator for an automatically determined lane status provides a particular improvement routed in the technology of automatic lane status determination.

FIG. 3 illustrates a flowchart depicting a method according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus 20 employing an embodiment of the present invention and executed by the processing circuitry 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least processing circuitry and at least one non-transitory memory including computer program code instructions, the computer program code instructions configured to, when executed by the processing circuitry, cause the apparatus to:
  determine a subset of probe data collected from at least one of a vehicle or a mobile device traveling along at least one segment;
  partition the subset of the probe data into a same number of clusters as the probe data is partitioned, wherein the probe data is clustered based on respective lateral positional indicators; and
  determine a lane status confidence indicator for the at least one segment based upon statistical measures of clusters of the probe data, and the respective statistical measures of the respective clusters of the subset of the probe data;
  determine whether the lane status confidence indicator satisfies a lane status confidence indicator criterion;
  transmit an indication of a lane status determination to another apparatus in an instance the lane status confidence indicator criterion is satisfied; and
  prevent the indication of the lane status determination from being transmitted to another apparatus in an instance the lane status confidence indicator criterion is not satisfied.

2. The apparatus according to claim 1, wherein determining the lane status confidence indicator comprises calculating offsets between the statistical measures of the clusters of the probe data, and the respective statistical measures of the respective clusters of the subset of the probe data.

3. The apparatus according to claim 2, wherein determining the lane status confidence indicator comprises calculating a mean of the offsets between the statistical measures of the clusters of the probe data, and the respective statistical measures of the respective clusters of the subset of the probe data.

4. The apparatus according to claim 1, wherein the lane status determination comprises at least one of a lane closure or lane shifting.

5. The apparatus according to claim 1, wherein the statistical measures are mean lateral positional indicators for the respective clusters.

6. The apparatus according to claim 1, wherein the partitioning is performed using at least a k-means algorithm.

7. A method comprising:
  determining a subset of probe data collected from at least one of a vehicle or a mobile device traveling along at least one segment;
  with at least a processor of an apparatus, partitioning the subset of the probe data into a same number of clusters as the probe data is partitioned, wherein the probe data is clustered based on respective lateral positional indicators;
  determining a lane status confidence indicator for the at least one segment based upon statistical measures of clusters of the probe data, and the respective statistical measures of the respective clusters of the subset of the probe data;
  determining whether the lane status confidence indicator satisfies a lane status confidence indicator criterion;
  transmitting an indication of a lane status determination to another apparatus in an instance the lane status confidence indicator criterion is satisfied; and
  preventing the indication of the lane status determination from being transmitted to another apparatus in an instance the lane status confidence indicator criterion is not satisfied.

8. The method according to claim 7, wherein determining the lane status confidence indicator comprises calculating offsets between the statistical measures of the clusters of the probe data, and the respective statistical measures of the respective clusters of the subset of the probe data.

9. The method according to claim 8, wherein determining the lane status confidence indicator comprises calculating a mean of the offsets between the statistical measures of the clusters of the probe data, and the respective statistical measures of the respective clusters of the subset of the probe data.

10. The method according to claim 7, wherein the lane status determination comprises at least one of a lane closure or lane shifting.

11. The method according to claim 7, wherein the statistical measures are mean lateral positional indicators for the respective clusters.

12. The method according to claim 7, wherein the partitioning is performed using at least a k-means algorithm.

13. A computer program product comprising at least one non-transitory computer-readable storage medium having computer-executable program code instructions stored therein, the computer-executable program code instructions comprising program code instructions to cause an apparatus to:
  determine a subset of probe data collected from at least one of a vehicle or a mobile device traveling along at least one segment;
  partition the subset of the probe data into a same number of clusters as the probe data is partitioned, wherein the probe data is clustered based on respective lateral positional indicators; and
  determine a lane status confidence indicator for the at least one segment based upon statistical measures of clusters of the probe data, and the respective statistical measures of the respective clusters of the subset of the probe data;
  determine whether the lane status confidence indicator satisfies a lane status confidence indicator criterion;
  transmit an indication of a lane status determination to another apparatus in an instance the lane status confidence indicator criterion is satisfied; and
  prevent the indication of the lane status determination from being transmitted to another apparatus in an instance the lane status confidence indicator criterion is not satisfied.

14. The computer program product according to claim 13, wherein determining the lane status confidence indicator comprises calculating offsets between the statistical measures of the clusters of the probe data, and the respective statistical measures of the respective clusters of the subset of the probe data.

15. The computer program product according to claim 14, wherein determining the lane status confidence indicator comprises calculating a mean of the offsets between the statistical measures of the clusters of the probe data, and the respective statistical measures of the respective clusters of the subset of the probe data.

16. The computer program product according to claim 13, wherein the lane status determination comprises at least one of a lane closure or lane shifting.

17. The computer program product according to claim 13, wherein the statistical measures are mean lateral positional indicators for the respective clusters.

* * * * *

UNITED STATES PATENT AND TRADEMARK OFFICE
CERTIFICATE OF CORRECTION

PATENT NO. : 11,580,850 B2
APPLICATION NO. : 17/116469
DATED : February 14, 2023
INVENTOR(S) : James Adeyemi Fowe It is certified that error appears in the above-identified patent and that said Letters Patent is hereby corrected as shown below:

In the Drawings

In sheet 3 of 4, FIG. 3C, Y-axis, Line 1, delete " Frequency " and insert -- Frequency --, therefor.

In the Claims

In Column 19, Line 25, Claim 1, delete "indicators; and" and insert -- indicators; --, therefor.

In Column 20, Line 47, Claim 13, delete "indicators; and" and insert -- indicators; --, therefor.

Signed and Sealed this
Fifth Day of November, 2024

Katherine Kelly Vidal
*Director of the United States Patent and Trademark Office*